(12) United States Patent
Tuccio et al.

(10) Patent No.: US 11,450,213 B2
(45) Date of Patent: Sep. 20, 2022

(54) FLIGHT DECK SYSTEM FOR DETERMINING APPROACH MINIMA

(71) Applicant: Garmin International, Inc., Olathe, KS (US)

(72) Inventors: William A. Tuccio, Overland Park, KS (US); Jason E. Hewes, Paola, KS (US); Tiziano Bernard, Kansas City, MO (US); Eric W. Sargent, Gardner, KS (US); Joseph L. Komer, Shawnee, KS (US)

(73) Assignee: Garmin International, Inc., Olathe, KS (US)

( * ) Notice: Subject to any disclaimer, the term of this patent is extended or adjusted under 35 U.S.C. 154(b) by 74 days.

(21) Appl. No.: 17/140,788

(22) Filed: Jan. 4, 2021

(65) Prior Publication Data
US 2022/0215764 A1 Jul. 7, 2022

(51) Int. Cl.
*G08G 5/00* (2006.01)
*G08G 5/02* (2006.01)
(Continued)

(52) U.S. Cl.
CPC ......... *G08G 5/0021* (2013.01); *G06F 3/0482* (2013.01); *G06F 3/04817* (2013.01); *G08G 5/0091* (2013.01); *G08G 5/025* (2013.01)

(58) Field of Classification Search
CPC . G06F 3/04817; G06F 3/0482; G08G 5/0021; G08G 5/0091; G08G 5/025
See application file for complete search history.

(56) References Cited

U.S. PATENT DOCUMENTS 9,527,601 B2 * 12/2016 Wyatt ................... B64D 45/08
10,114,381 B2 10/2018 Haskins et al.
(Continued)

OTHER PUBLICATIONS

ForeFlight, and ForeFlight. "ForeFlight 8: Global Data-Driven Aeronautical Maps, Logbook Enhancements, TFR Alerts." ForeFlight, Jun. 27, 2019, blog.foreflight.com/2016/08/30/foreflight-8-global-data-driven-aeronautical-maps-logbook-enhancements-tfr-alerts/.
(Continued)

*Primary Examiner* — Seth A Silverman
(74) *Attorney, Agent, or Firm* — Samuel M. Korte; Max M. Ali (57) ABSTRACT

A flight deck system for an aircraft includes a processor, a graphical interface for displaying flight-related information in the form of selectable items, a control interface for receiving a selection of the selectable items, and a non-transitory computer-readable storage medium for storing electronic representations of charts. The selectable items correspond to the electronic representations of charts, and the electronic representations of charts describe minima and associated conditional criteria for operating the aircraft (e.g., proximate to an airport). The processor is configured to arrange the selectable items, receive a selection of the selectable items, identify a corresponding one of the electronic representations of charts, receive a condition associated with the aircraft, compare the condition to the conditional criteria for operating the aircraft to identify an applicable one of the plurality of minima, and display the applicable one of the plurality of minima on the graphical interface.

18 Claims, 7 Drawing Sheets

(51) Int. Cl.
*G06F 3/04817* (2022.01)
*G06F 3/0482* (2013.01)

(56) References Cited

U.S. PATENT DOCUMENTS

| | | | | |
|---|---|---|---|---|
| 2010/0262318 | A1* | 10/2010 | Ariens | G08G 5/003 |
| | | | | 701/3 |
| 2016/0125743 | A1* | 5/2016 | Shorter, Jr | G06F 3/048 |
| | | | | 701/528 |
| 2019/0340932 | A1* | 11/2019 | Gannon | G06T 11/60 |
| 2021/0117069 | A1* | 4/2021 | Komer | G06F 3/0481 |
| 2021/0208779 | A1* | 7/2021 | Nielsen | G06F 3/04886 |

OTHER PUBLICATIONS

Jaworksi, J. M., Yeh, M., & Swider, C. (2019). Pilot Information Needs for Electronic Data-Driven Charts. 20th International Symposium on Aviation Psychology, 301-306. https://corescholar.libraries.wright.edu/isap_2019/51.

Operational Efficiency of Dynamic Navigation Charting, www.boeing.com/commercial/aeromagazine/articles/2012_q2/2/.

Tuccio, William A. "Aviation Approach Charts in an IPad® World." Journal of Navigation, vol. 66, No. 1, 2012, pp. 135-147., doi:10.1017/s0373463312000409.

* cited by examiner

| | Procedure | Mins (ft) | RVR |
|---|---|---|---|
| Airport Diagram | KMFR ILS 14 | 1200 | 40 3/4 |
| Departure | LOC - 10 | 1200 | 18 1/4 |
| Arrival | RNAV(GPS) LPV - 10 | 1200 | 2 |
| Approach | GPS - A | 1200 | 40 3/4 |

FLIGHT DECK SYSTEM FOR DETERMINING APPROACH MINIMA

BACKGROUND

Approach minima describe the minimum visibility as well as lowest altitude on an instrument approach to which a pilot may legally descend without being able to see the runway environment (e.g., the runway, runway lights, approach lights, etc.). Approach minima will vary from approach to approach based on a variety of criteria.

DRAWINGS

The Detailed Description is described with reference to the accompanying figures. The use of the same reference numbers in different instances in the description and the figures may indicate similar or identical items.

DETAILED DESCRIPTION

A flight deck system can include electronic devices, such as integrated avionics systems, which are utilized by one or more aircraft operators (e.g., a pilot and/or a co-pilot) to navigate an aircraft. Integrated avionics systems may employ primary flight display(s) (PFDs), multifunction display(s) (MFDs), and electronic flight bags (EFBs) to furnish primary flight control, navigational, and other information to the flight crew of the aircraft. Additionally, the integrated avionics systems may also employ an avionics control and display unit (CDU), portable electronic devices (PEDs), applications, and/or other control devices that are configured to provide control functionality to the PFDs, the MFDs and/or the EFBs.

There is a recognized need to provide the operator (e.g., pilot or co-pilot) with increased automation of aircraft operations. Aircraft operations requiring significant manual control and/or significant manual data entry are inefficient, increase heads-down time, and increase the risk of operator error. For example, utilizing an instrument approach at an airport requires adjustment of visibility and ceiling minimums for current aircraft equipage status and/or current conditions at the airport. Errors resulting from the manual adjustment of these minimums can put the operator at risk of violating regulations (e.g., Federal Aviation Administration regulations) or colliding with terrain. Further, for efficiency and/or safety of operation, it may also be beneficial to provide such necessary flight information to the operator through an accessible and user-friendly interface.

Accordingly, flight deck systems and methods for operating flight deck systems for controlling an aircraft are described. In an embodiment, a flight deck system (e.g., integrated avionics system) for an aircraft includes a processor, a graphical interface for displaying flight-related information in the form of selectable items, a control interface for receiving a selection of the selectable items, and a non-transitory computer-readable storage medium for storing electronic representations of charts. Each selectable item corresponding to one of the electronic representations of charts. Each of the electronic chart representations describes one or more minima and associated conditional criteria for operating an aircraft. The non-transitory computer-readable storage medium has computer executable instructions stored thereon for execution by the processor to arrange the selectable items on the graphical interface and receive a selection of one of the selectable items. In response to the selection, the processor is operable to identify one of the electronic representations of charts, receive at least one condition associated with the aircraft, and compare the condition to the conditional criteria described by the identified electronic chart representation to identify an applicable minima. The processor is further operable to display the applicable minima on the graphical interface.

Example Embodiments

Figure 1:
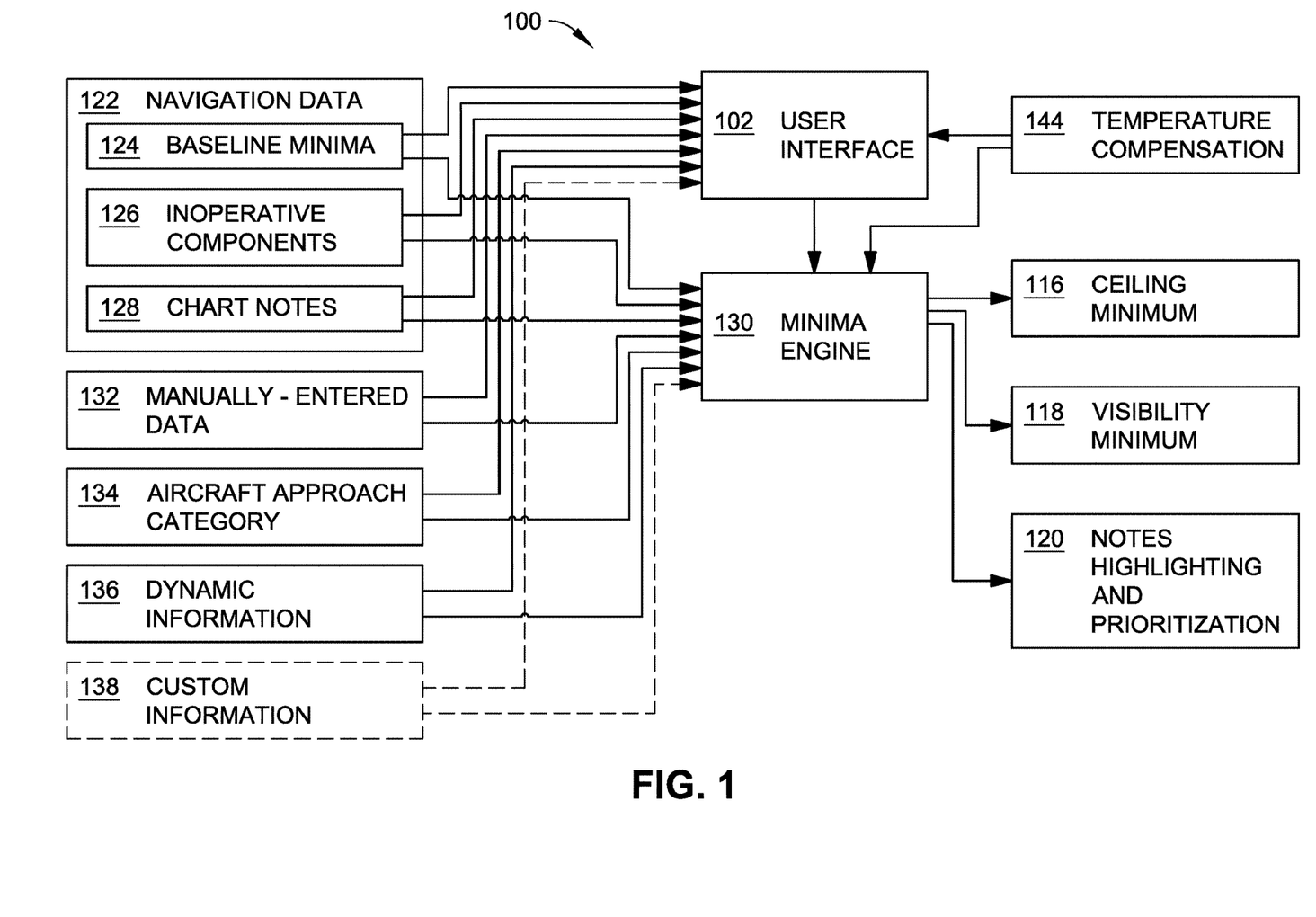
FIG. 1 is a block diagram illustrating a system for displaying flight-related information for an aircraft, where the system is configured to receive a selection of the flight-related information, identify an applicable electronic representation of a chart based upon the selection, and display a minimum based upon comparing a condition associated with the aircraft to the applicable electronic representation of the chart in accordance with example embodiments of the present disclosure.
Figure 2:
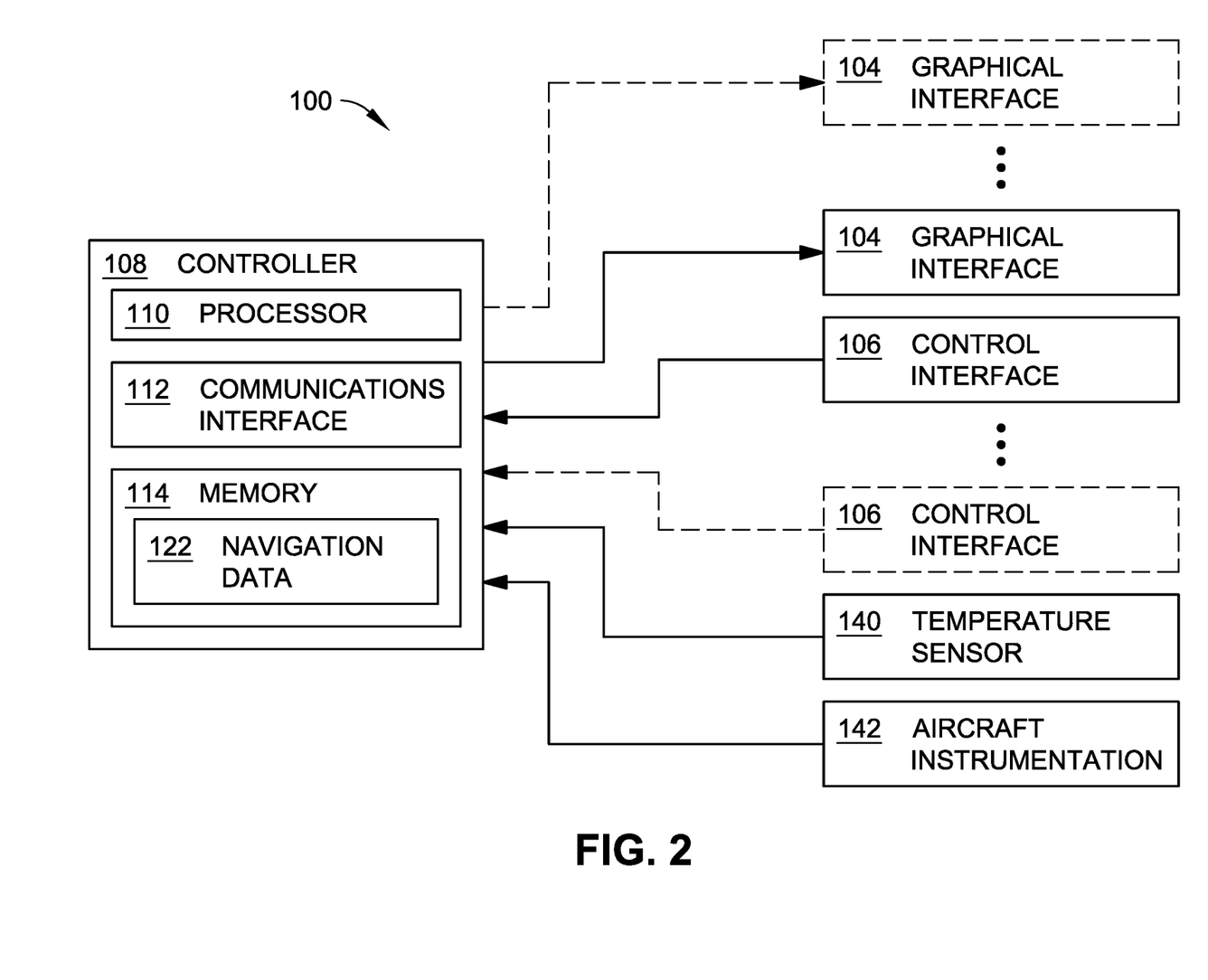
FIG. 2 is a block diagram further illustrating the system of FIG. 1.

FIGS. 1 and 2 illustrate an example embodiment of a flight deck system (e.g., integrated avionics system 100) within an aircraft. The integrated avionics system 100 generally includes a user interface 102 having a graphical interface 104 and a control interface 106. The integrated avionics system 102 also includes a controller 108 having a processor 110, a communications interface 112, and a non-transitory computer-readable storage medium (e.g., memory 114).

The user interface 102 includes graphical interface 104 for displaying information and control interface 106 that allows a pilot (e.g., pilot, co-pilot, and/or other aircraft operator) to provide input. In some embodiments, the control interface 106 is a touch screen interface, such as an electronic visual display that incorporates a touch panel overlying an electronic display to detect the presence and/or location of a touch within the display area of the screen. In these embodiments, the pilot can provide input using an instrument such as a finger, a stylus, and so forth. In some embodiments, the control interface 106 allows the pilot to provide non-touch input via one or more keyboards, cursors, buttons, knobs, dials, control columns, and so forth.

The graphical interface 104 includes a display, such as an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information on a display screen. The display screen can be backlit via a backlight such that it can be viewed in the dark or other low-light environments. In some embodiments, the graphical interface 104 can be disposed on an instrument panel of the aircraft, a pedestal area of the aircraft, an outboard area of the aircraft, and so forth. In embodiments, the integrated avionics system 100 can include one or more graphical interfaces 104 with corresponding displays for providing differing functionality including, but not limited to: PFD(s), MFD(s), head up display(s) (HUDs), secondary display unit(s) (SDUs), CDU(s), PED(s), electronic flight bag(s) (EFBs), and so forth. The graphical interfaces 104 may furnish a general-purpose pilot interface to control the aircraft's avionics. For example, the graphical interfaces 104 allow the pilot to control various systems of the aircraft such as the aircraft's flight management system, autopilot system, navigation systems, communication systems (e.g., controller pilot data link communications system [CDPLC], automatic dependent surveillance-broadcast [ADS-B], aircraft communications addressing and reporting system [ACARS], airborne satellite communications systems [SATCOM], other data link systems, other air-ground communication systems, etc.), engines, and so on, via the avionics data bus. In implementations, the avionics data bus may include a high-speed data bus (HSDB), such as data bus complying with ARINC 429 data bus standard promulgated by the Airlines Electronic Engineering Committee (AEEC), a MIL-STD-1553 compliant data bus, and so forth.

The control interface 106 can be coordinated with the graphical interface 104 for entry of data and commands. In embodiments including a touch screen interface, the operator may use his or her fingers to manipulate images and/or selectable items on the graphical interface 104. The control interface 106 can be displayed on the graphical interface 104, external to the graphical interface 104, or a combination thereof. In some embodiments, the graphical interface 104 is operable by a combination of direct touch received via the touch screen interface and input received external to the graphical interface 104.

In embodiments including a touch screen interface, the control interface 106 includes a touch surface. For example, the touch surface can be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens can include surface capacitance touch screens, projected capacitance touch screens, mutual capacitance touch screens, and self-capacitance touch screens. In implementations, the touch surface is configured with hardware to generate a signal to send to a processor and/or driver upon detection of touch information (e.g., a touch input). As indicated herein, touch inputs include inputs, gestures, and movements where the input contacts the touch surface. In embodiments, the control interface 106 can receive touch information from an operator (e.g., user such as a pilot and/or a co-pilot) to interact with the graphical interface 104 displayed on the display screen. In some embodiments, the graphical interface 104 may include both active portions (e.g., areas that are responsive to operator touch information) and non-active portions (e.g., areas that are not responsive to operator touch information). In implementations, keyboards, cursors, buttons, softkeys, keypads, knobs and so forth, may be used for entry of data and commands instead of or in addition to the touch surfaces.

In embodiments, the graphical interface 104 is configured for displaying flight information. In some embodiments, the flight-related information includes information related to a flight plan and/or aeronautical charts for the aircraft. As described below, flight information can include one or more minima (e.g., ceiling minimum 116, visibility minimum 118, etc.) related to a published instrument approach for the airport, and notes, highlighting, or prioritization information 120 related thereto. In some embodiments, the flight-related information is displayed in one or more primary flight windows (PFWs), one or more multifunction windows (MFWs), or a combination thereof. The PFWs may be configured to display primary flight information, such as aircraft attitude, altitude, heading, vertical speed, and so forth. In embodiments, the PFWs may display primary flight information via a graphical representation of basic flight instruments such as an attitude indicator, an airspeed indicator, an altimeter, a heading indicator, a course deviation indicator, and so forth. The PFWs may also display other flight-related information providing situational awareness to the pilot such as terrain information, ground proximity warning information, weather information, and so forth. The PFWs may also display minima-related information such as altitude, visibility, minima-related notes, and so forth.

In embodiments, The MFWs display interactive flight-related information 106 describing operation of the aircraft such as navigation routes, moving maps, engine gauges, weather radar, terrain alerting and warning system (TAWS) displays, ground proximity warning system (GPWS) displays, traffic collision avoidance system (TCAS) displays, airport moving map (AMM) displays, airport information, and so forth, that are received from a variety of aircraft systems via the avionics data bus and/or are self-contained within the user interface 102. In some embodiments, the PFW may provide the functionality of an MFW. Where the system 100 includes multiple MFWs, MFWs that control a common systemwide value/state can be cross-filled when multiple instances viewing this value are active substantially simultaneously. Further, the graphical interface 104 may be capable of displaying multiple instances of the same application in multiple MFWs, for example, with no restrictions on the number of the same application that could be displayed substantially simultaneously. In some embodiments, MFWs and/or PFWs shall support display and/or control of third-party applications (e.g., video, hosted applications, ARINC 661, etc.).

The controller 108 provides functionality to the user interface 102 via the processor 110, the communications interface 112, and the memory 114. The processor 110 can be operably and/or communicatively coupled with the graphical interface 104 and/or the control interface 106. The processor 110 can control the components and functions of the system 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the system 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processor 110 provides processing functionality for the system 102 and can include any number of processors, micro-controllers, or other processing systems, and resident or external memory for storing data and other information accessed or generated by the system 100. The processor 110 can execute one or more software programs that implement techniques described herein. The processor 110 is not limited by the materials from which it is formed or the processing mechanisms employed therein and, as such, can be implemented via semiconductor(s) and/or transistors (e.g., using electronic integrated circuit (IC) components), and so forth.

The communications interface 112 is operatively configured to communicate with components of the system 100. For example, the communications interface 112 can be configured to transmit data for storage in the system 110, retrieve data from storage in the system 100, and so forth. The communications interface 112 is also communicatively coupled with the processor 110 to facilitate data transfer between components of the system 100 and the processor 110 (e.g., for communicating inputs to the processor 110 received from a device communicatively coupled with the system 100). It should be noted that while the communications interface 112 is described as a component of a system 100, one or more components of the communications interface 112 can be implemented as external components communicatively coupled to the system 100 via a wired and/or wireless connection. The system 100 can also include and/or connect to one or more input/output (I/O) devices (e.g., via the communications interface 112), including, but not necessarily limited to: a display, a mouse, a touchpad, a keyboard, and so on.

The communications interface 112 and/or the processor 110 can be configured to communicate with a variety of different networks, including, but not necessarily limited to: ARINC 429; RS-232; RS-422; CAN Bus; ARINC 661; a wide-area cellular telephone network, such as a 3G cellular network, a 4G cellular network, a 5G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 112 can be configured to communicate with a single network or multiple networks across different access points. The communications interface 112 can facilitate integration of aircraft alerts and/or notifications (e.g., notice to airmen [NOTAM], National Oceanic and Atmospheric Administration [NOAA] weather alerts, Safety Alerts, air-ground communications, etc.) with other components of system 100.

The memory 114 is an example of tangible, computer-readable storage medium that provides storage functionality to store various data associated with operation of the system 100, such as software programs and/or code segments, or other data to instruct the processor 110, and possibly other components of the system 100, to perform the functionality described herein. Thus, the memory 114 can store data, such as a program of instructions for operating the system 100 (including its components), and so forth. It should be noted that while a single memory 114 is described, a wide variety of types and combinations of memory (e.g., tangible, non-transitory memory) can be employed. The memory 114 can be integral with the processor 110, can include stand-alone memory, or can be a combination of both.

The memory 114 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 114 can include removable integrated circuit card (ICC) memory, such as memory provided by a subscriber identity module (SIM) card, a universal subscriber identity module (USIM) card, a universal integrated circuit card (UICC), and so on. In embodiments, the memory 114 includes one or more software modules capable of being executed by the processor 110, and one or more data sets and/or databases. In embodiments, the memory 114 includes one or more software modules capable of being executed by the processor 110, and one or more data sets and/or databases.

The memory 114 is operable to store a database of flight-related information associated with a flight plan and/or aeronautical charts for an aircraft. In some embodiments, flight-related information includes electronic representations of aeronautical charts (e.g., instrument approach charts, airport diagrams, departure procedure charts, standard terminal arrival charts, charted visual flight procedure charts, etc.) describing procedures and information for operating the aircraft under specified circumstances (e.g., in proximity to an airport). In a specific embodiment, the flight-related information includes electronic representations of instrument approach charts. Each electronic representation of an instrument approach chart is described by navigation data 122 for operating the aircraft in proximity to an airport. Navigational data 122 can include a one or more baseline minima 124 (e.g., visibility minimum, ceiling minimum, etc.) associated with the airport. Navigation data 122 can also include conditional criteria associated with the baseline minima 124 including, but not limited to adjustments for inoperative components 126 (e.g., based on operational status of aircraft systems and/or instrumentation; airport equipment such as approach lighting, weather reporting, and so forth; etc.), procedural chart notes 128 (e.g., instructional notes associated with the approach such as instrument-specific notes, temperature notes, restrictions, etc.), and so forth. It is to be understood that navigation data 122 can also include additional data related to the operation of the aircraft.

Still referring to FIGS. 1 and 2, the system 100 includes a minima engine 130 that is stored in the memory 114 and executable by the processor 110. In embodiments, the minima engine 130 is operable to determine, based on the stored navigation data 122 and one or more condition associated with the aircraft (e.g., a condition associated with the approach procedure), at least one applicable minimum (e.g., ceiling minimum 116, visibility minimum 118, etc.). In some embodiments, the condition associated with the approach procedure includes an operational characteristic and/or an environmental characteristic. Operational characteristics can include, but are not limited to an aircraft approach category 134 or other aircraft speed characteristic, an altitude characteristic, and so forth. Environmental characteristics can include, but are not limited to temperature, wind speed, wind direction, weather rating, time of day, and so forth. In some embodiments, the condition associated with the aircraft includes a condition associated with an operational status of an aircraft system and/or instrument, and/or airport equipment. For example, the condition can include an inoperative component indicating a non-operational status of an aircraft system and/or instrument, and/or airport equipment (e.g., approach light system, touch down zone lights, runway centerlight system, altimeter reporting system, etc.). In some embodiments, the condition can include custom information 138 specific to the pilot. Custom information 138 can include, but are not limited to individual pilot minimums, organizational policies, and so forth. The condition associated with the aircraft can also include dynamic information 136 associated with a real-time characteristic of the aircraft, such as information related to notifications associated with the aircraft (e.g., NOTAMs, NOAA weather alerts, Safety Alerts, etc.), a real-time operating characteristic of the aircraft (e.g., true airspeed, etc.), a real-time environmental characteristic (e.g., a current weather condition), and so forth. It is contemplated that, in some embodiments, non-dynamic conditions of the aircraft are storable via the memory 114 and available for future use. It is to be understood that the terminology "conditions associated with the aircraft" and "information associated with the aircraft" also include conditions/information associated with the related environment including, but not limited to weather conditions, airport/ground conditions, and so forth.

The condition(s) associated with the aircraft or environment can be received by the minima engine 130 from a variety of sources. In some embodiments, the condition can be manually entered by the pilot (e.g., manually-entered data 132) via the control interface 106. For example, the graphical interface 104 can be configured to display one or more selectable items corresponding with conditions of the aircraft, as described below.

In some embodiments, the condition(s) associated with the aircraft is received directly from an aircraft system or instrument (e.g., aircraft instrumentation 142) including, but not limited to basic aircraft instruments (e.g., attitude indicator, an airspeed indicator, an altimeter, a heading indicator, a course deviation indicator, etc.), aircraft warning systems (e.g., TAWS, TCAS, GPWS, etc.), aircraft control systems (e.g., flight management system, autopilot system, navigation systems, communication systems, etc.), aircraft information systems (e.g., air data computers, etc.) and so forth. In some embodiments, the system 100 includes one or more sensors for providing data associated with a condition associated with the aircraft via the controller 108. For example, the system 100 can include a temperature sensor 140 for sensing an external environmental temperature associated with the aircraft (e.g., an airport temperature). In these embodiments, aircraft instruments 142 and/or sensors (e.g., temperature sensor 140) can be utilized to provide real-time data associated with a dynamic condition associated with the aircraft. As noted above, it is further contemplated that non-dynamic conditions of the aircraft may be preselected and retrievable from the memory 114. It is to be understood that the one or more sensors may be a component of the aircraft and/or the related environment (e.g., sensors located at the airport, etc.). Further, the sensors may obtain data about the aircraft and/or data about the related environment (e.g., an airport temperature, etc.).

In embodiments, the minima engine 130 is operable to compare the condition(s) associated with the aircraft to the baseline minima 124 and/or conditional criteria (e.g., inoperative components 126, chart notes 128), and identify one or more applicable minima (e.g., ceiling minimum 116, visibility minimum 118). For example, the minima engine 130 can determine an applicable ceiling minimum 116 and/or visibility minimum 118 by adjusting the baseline minima (e.g., baseline ceiling minimum, baseline visibility minimum, etc.) based on predetermined adjustment factors associated with the conditional criteria. It is to be understood that the terms "visibility minimum" and "visibility minima" are used herein to describe any minimum associated with the visual identification and/or recognition of objects. Examples of visibility minima include, but are not limited to: visibility, Runway Visual Range (RVR), and so forth. It is to be further understood that the terms "ceiling minimum" and "ceiling minima" are used herein to describe any minimum associated with aircraft altitude. Example of ceiling minima include, but are not limited to: descent altitude (DA), minimum descent altitude (MDA), and so forth. Ceiling minima and visibility minima may include pre-determined factors that are published by government authorities and/or factors that are operator-specific.

In some embodiments, the minima engine 130 is further operable to compare an external environmental condition(s) (e.g., external environmental temperature such as an airport temperature) to the conditional criteria to further identify the applicable minima. In a specific embodiment, the processor 110 is operable to obtain an external environmental temperature associated with the aircraft from the temperature sensor 140. The processor 110 then utilizes the external environmental temperature to determine if a temperature compensation 144 (e.g., cold temperature compensation) is required for identifying the applicable minima. For example, the ceiling minimum may require a temperature compensation 144 to correct for altimeter temperature limitations. Alternatively, the pilot may enter the external environmental temperature manually via the user interface 102. In other embodiments, the processor 110 may obtain the external environmental temperature via the communications interface 112, or from other aircraft systems and/or instrumentation.

In embodiments, the processor 110 is operable to display, via the graphical interface 104, the applicable minima to the pilot. In some embodiments, the processor 110 is operable to display real-time adjustments to the baseline minima 124. For example, the processor 110 may cause the graphical interface 104 to initially display the baseline minima 124, and then display the real-time adjustments as the minima engine 130 determines the applicable minima. In some embodiments, the processor 110 is operable to display additional data corresponding to the electronic representations of charts and/or the condition(s) associated with the aircraft, as described below.

In some embodiments, the processor 110 is operable to display via the graphical interface 104, procedural notes 120 or other clarifying information related to the applicable minima and/or the corresponding electronic chart representation. The processor 110 is further operable, via the minima engine 130, to identify a highlighting or other prioritization of the graphical interface 104 based on an applicable minima (e.g., notes highlighting and prioritization 120), as described below. The processor 110 may be further operable to dynamically reconfigure the highlighting and/or prioritization arrangement of the graphical interface 104 based on corresponding changes in the priority of the procedural notes 120.

Example Display Embodiments

Figure 3:
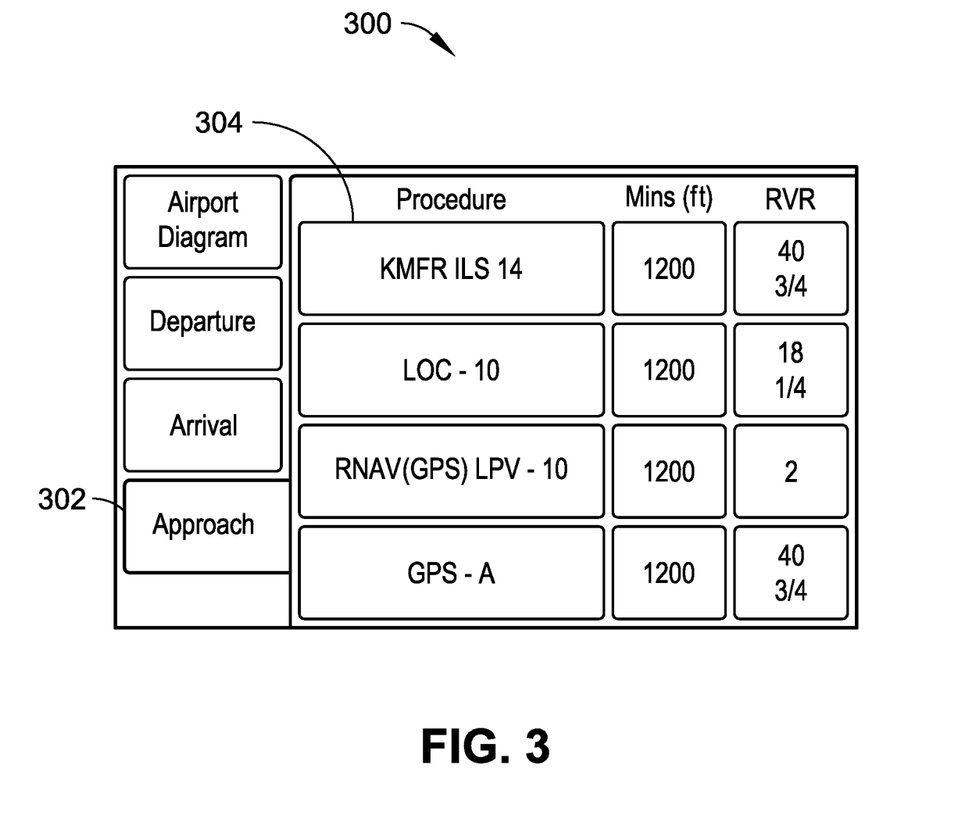
FIG. 3 is a diagrammatic illustration of a graphical interface, where flight-related information for an aircraft is displayed in accordance with an example embodiment of the present disclosure.
Figure 4A:
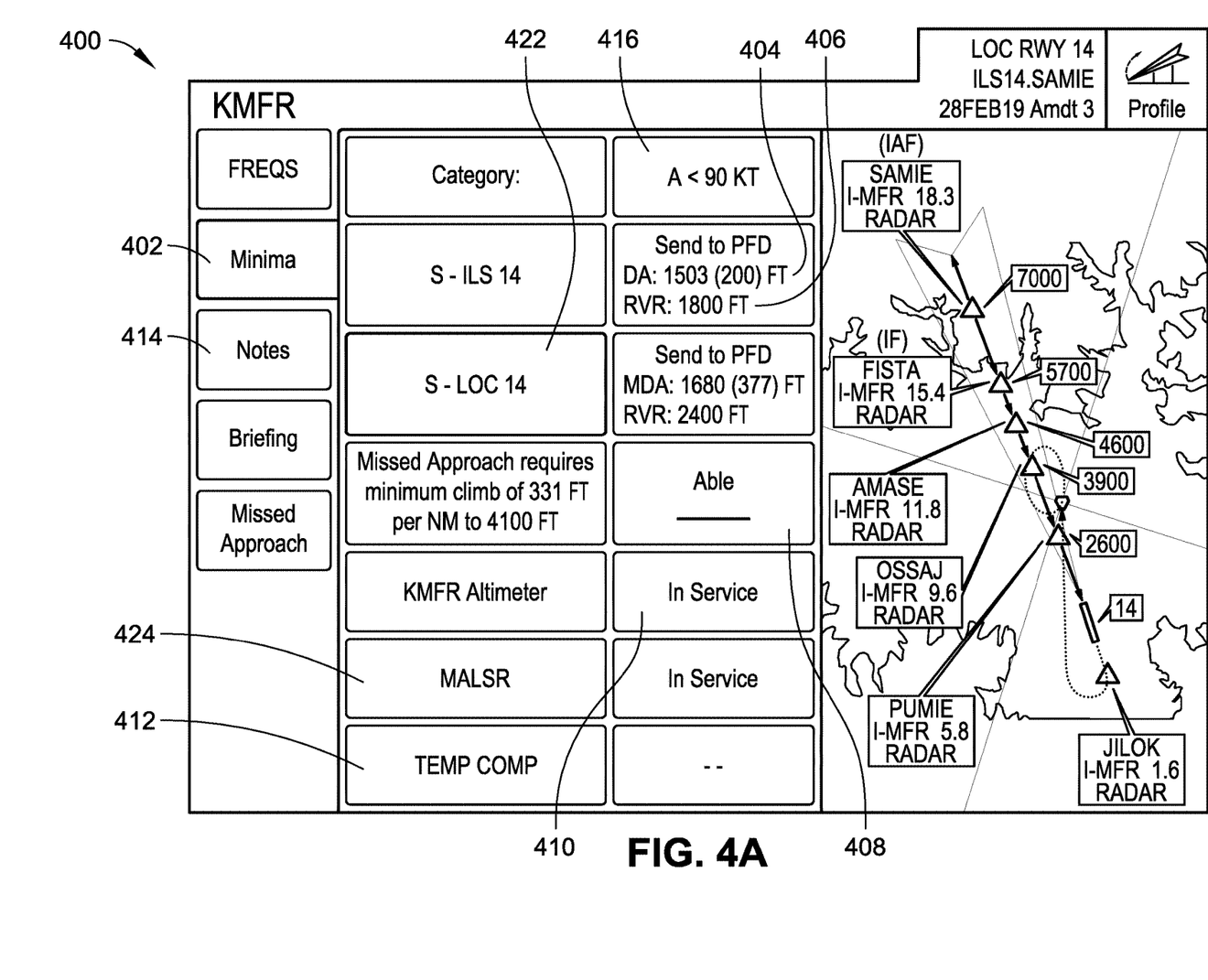
FIG. 4A is another diagrammatic illustration of the graphical interface illustrated in FIG. 3.
Figure 4B:
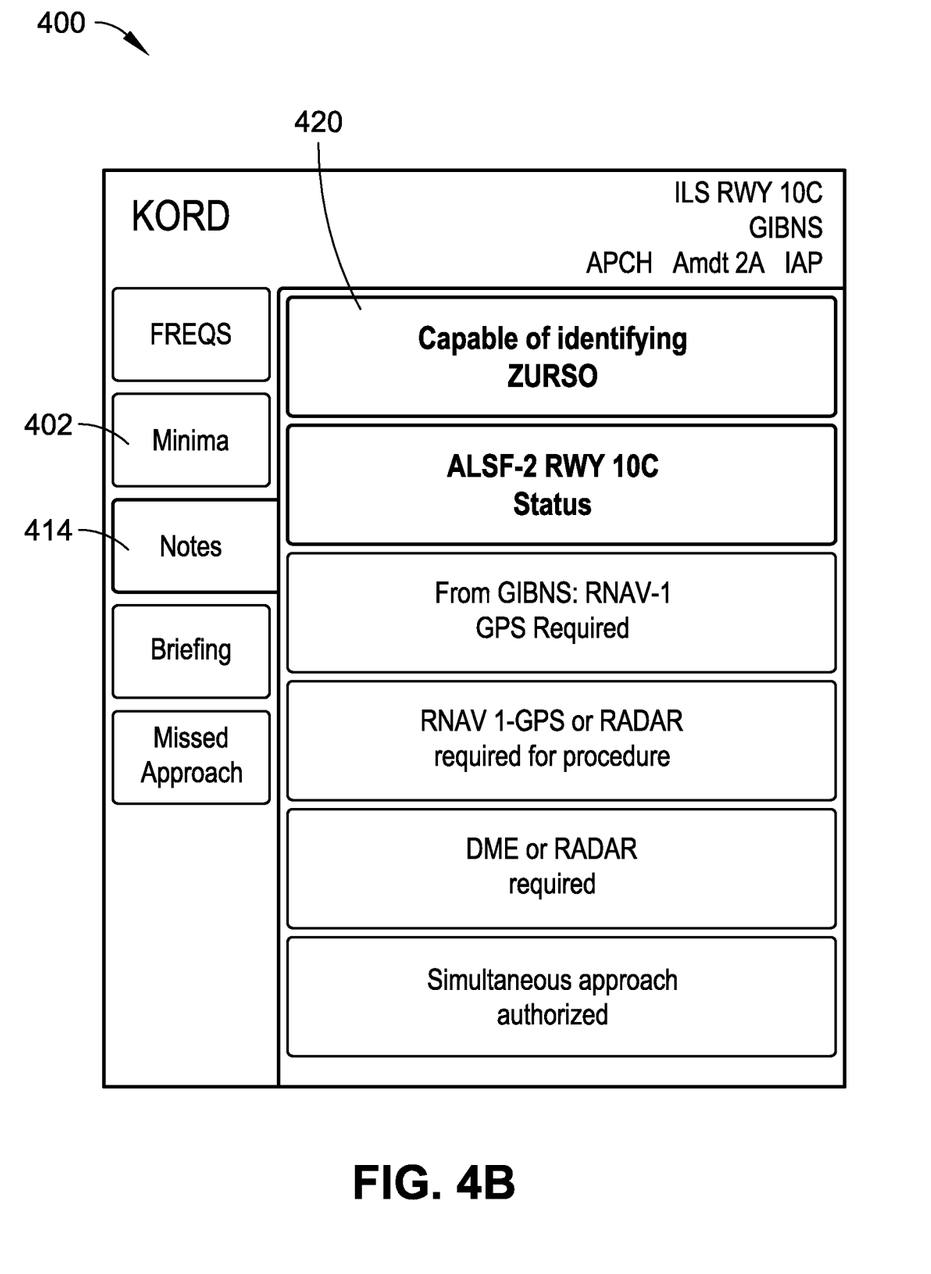
FIG. 4B is another diagrammatic illustration of the graphical interface illustrated in FIG. 3.

FIGS. 3 through 4B illustrate example displays 300, 400 furnishing flight information to the pilot, and configured to receive input from the pilot and provide functionality for the pilot to engage with the graphical interface 104. For example, the display 300 can include information related to the flight plan and/or approach charts.

In embodiments, the display 300, 400 can include one or more selectable items (buttons, selectable menus, etc.) arranged on the graphical interface 104 for receiving input from the pilot. The selectable items can correspond to one of the electronic representations of charts. For example, the display 300 can include selectable menu item (e.g., approach menu item 302; as describe with reference to FIG. 3) for receiving a selection of a chart type (e.g., departure, arrival, approach, etc.). Based on the pilot's selection of chart type (e.g., approach menu item 302), the processor 110 will populate the graphical interface 104 with selectable items related to the selected chart type. Such selectable items can include, for example, one or more selectable buttons (e.g., procedure button 304) for receiving a selection of a flight procedure associated with the selected chart type.

Based on the selection of a chart type and/or procedure, the processor 110 may cause additional interactive flight information to be displayed via the graphical interface 104, the additional interactive flight information corresponding to an electronic chart representation associated with the selected chart type and/or procedure. In some embodiments, the display 400 may include one or more selectable menu item (e.g., minima menu item 402, notes menu item 414, etc.) for displaying interactive flight information corresponding to the flight chart (e.g., as described with reference to FIG. 4A). Based on a selection of the minima button 402, for example, the processor 110 populates the graphical interface 104 with one or more selectable condition inputs for receiving input related to a condition associated with the aircraft (e.g., condition inputs 408, 410, 412, 416).

The condition inputs 408, 410, 412, 416 receive information about conditions of the aircraft corresponding to the minima and associated conditional criteria for the particular electronic chart representation. In some embodiments, the condition inputs receive information about an inoperative component of the aircraft and/or the airport environment (e.g., condition input 410; 424). For example, the display 400 includes one or more aircraft instruments and/or airport systems (e.g., KMFR Altimeter; Medium Intensity Approach Lighting System with Runway Alignment Indicator Lights [MALSR], etc.) used for the selected procedure, and corresponding condition input 410, 424 for entry of an "In Service" or "Out of Service" status. In some embodiments, the condition inputs receive information about an environmental characteristic (e.g., temperature, precipitation type/level, wind speed, wind direction, weather rating, time of day, restricted air space, etc.) associated with the aircraft (e.g., condition input 412). For example, the condition input 412 may activate or receive entry of a cold weather compensation associated (e.g., based on an external temperature associated with the aircraft). In some embodiments, the condition inputs receive information about an operational characteristic (e.g., approach category or other aircraft speed characteristic, altitude characteristic, etc.) associated with the aircraft (e.g., condition input 416). For example, the condition input can receive a selection of an aircraft approach category 134 associated with the aircraft (e.g., condition input 416). Condition inputs related to operational characteristics can also include functionality to "able" or "disable" the aircraft's ability to comply with procedural requirements. For example, condition input 408 may restrict the aircraft from performing the approach.

It is to be understood that, while specific condition inputs are shown in FIG. 4A, the display 400 may include additional condition inputs. Such additional conditional inputs can include, but are not limited to stepdown fix input, day/night input, tower status input, restricted airspace input, simultaneous runway operations input, other condition inputs customizable to the corresponding electronic chart representation, and so forth.

The display 400 further includes one or more ceiling minimum 404 (e.g., descent altitude, minimum descent altitude, etc.) and/or visibility minimum 406 (e.g., visibility, RVR, etc.). As described above, the ceiling minimum 404 and/or visibility minimum 406 are calculated based on the baseline minima and conditional criteria associated with the electronic chart representation, and the condition information received via the graphical interface 104. In some embodiments, the display 400 is configured to show the initial baseline minima corresponding to the electronic chart representation, and show real-time adjustments of the ceiling minimum 404 and/or visibility minimum 406 as the applicable minima are identified based on the condition inputs received from the pilot, aircraft instrumentation, aircraft instruments, aircraft sensors, and so forth. In some embodiments, the displayed minima can be arranged or categorized with corresponding titles 422.

In some embodiments, the processor 110 is operable to display via the graphical interface 104, procedural notes or other clarifying information related to the displayed minima and/or the corresponding electronic chart representation, for example based on a selection of the notes menu item 414 (e.g., as described with reference to FIG. 4B). Such procedural notes may include navigational equipment required for the selected procedure, approach authorization information, other navigational notes related to the procedure, and so forth. The processor 110 is further operable, via the minima engine 130, to identify a highlighting or other prioritization of the graphical interface 104 based on the applicable minima. For example, display 400 may feature notes of high priority (e.g. note 420) in highlighting and/or arrange such notes 420 in a prioritized position (e.g., at the top of the notes window of the display 400). Such highlighting and/or prioritization can be utilized to indicate importance and/or hierarchical order of procedural notes, allowing the pilot to quickly identify critical information and reducing heads-down time. As described above, the highlighting and/or prioritization arrangement of the display 400 can be dynamically reconfigured to reflect corresponding changes in the priority and/or importance of procedural notes. In some embodiments, the processor 110 is operable to remove notes from the display, for example, if not applicable to the aircraft category.

It is to be understood that the display 300, 400 can be configured to receive one or more types of pilot input via the control interface 106. In some embodiments, the display 300, 400 is configured for touch inputs (buttons, selectable menus, etc.) received via a touch surface. In other embodiments, pilot input can be received from other input devices (buttons, cursors, bezels, wheels, etc.) of the integrated avionics system 100. Additionally, features of the displays 300, 400 of the graphical interface 104 and the other input devices can be configured based on the specifications of the aircraft to provide an accessible and user-friendly interface. It is to be further understood that the display 300, 400 can be configured to display condition information received from a variety of sources including, but not limited to: pilot input, data received from other aircraft systems, data received from aircraft instrumentation, data received from airport or ground systems/instrumentation, data received from aircraft or environmental sensors (e.g., airport sensors), data received via the aircraft communications system, and so forth.

Example Processes

Figure 5A:
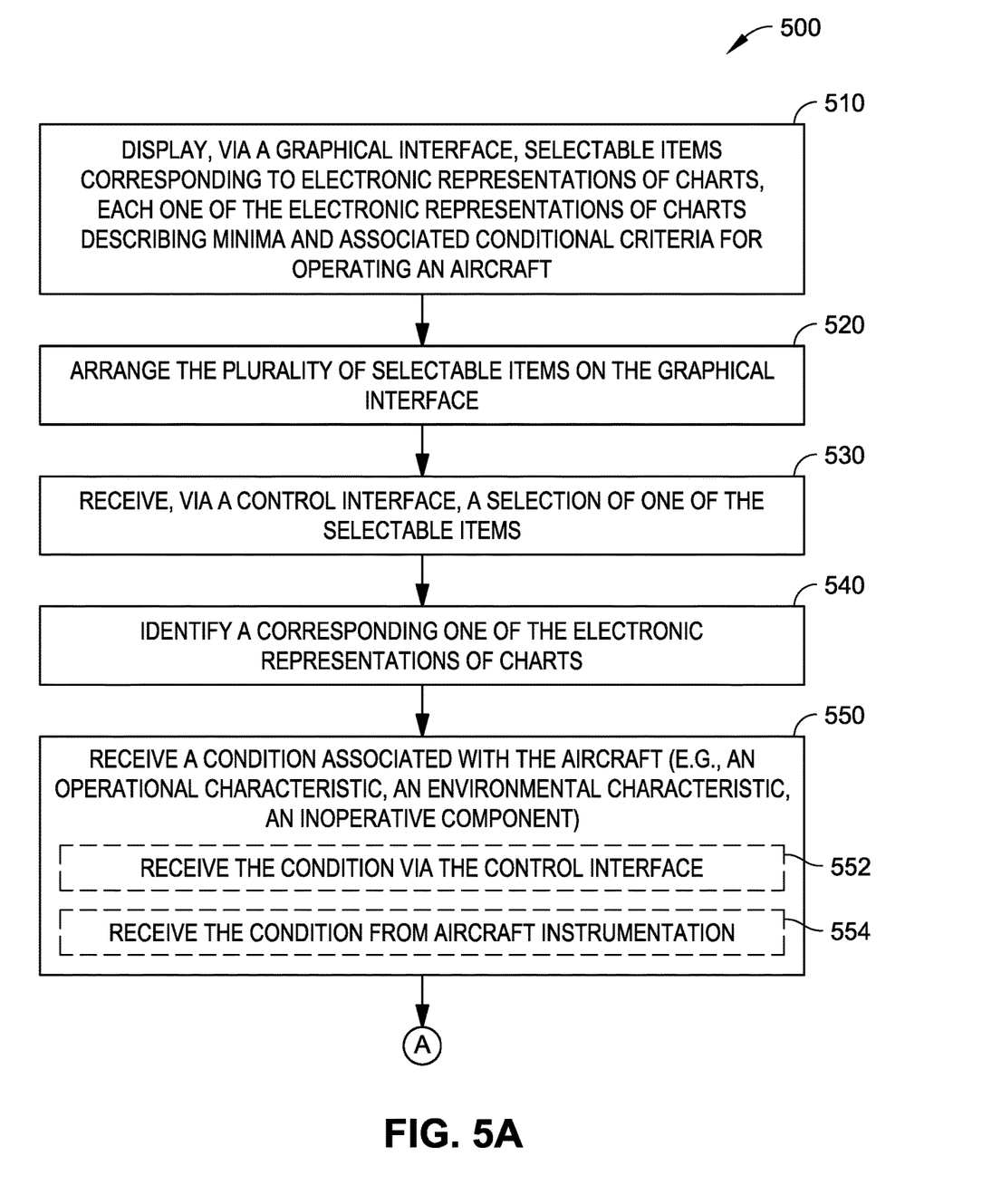
FIG. 5A is a flow diagram illustrating a method for displaying flight-related information for an aircraft, receiving a selection of the flight-related information, identifying an applicable electronic representation of a chart based upon the selection, and displaying a minimum based upon comparing a condition associated with the aircraft to the applicable electronic representation of the chart in accordance with example embodiments of the present disclosure.
Figure 5B:
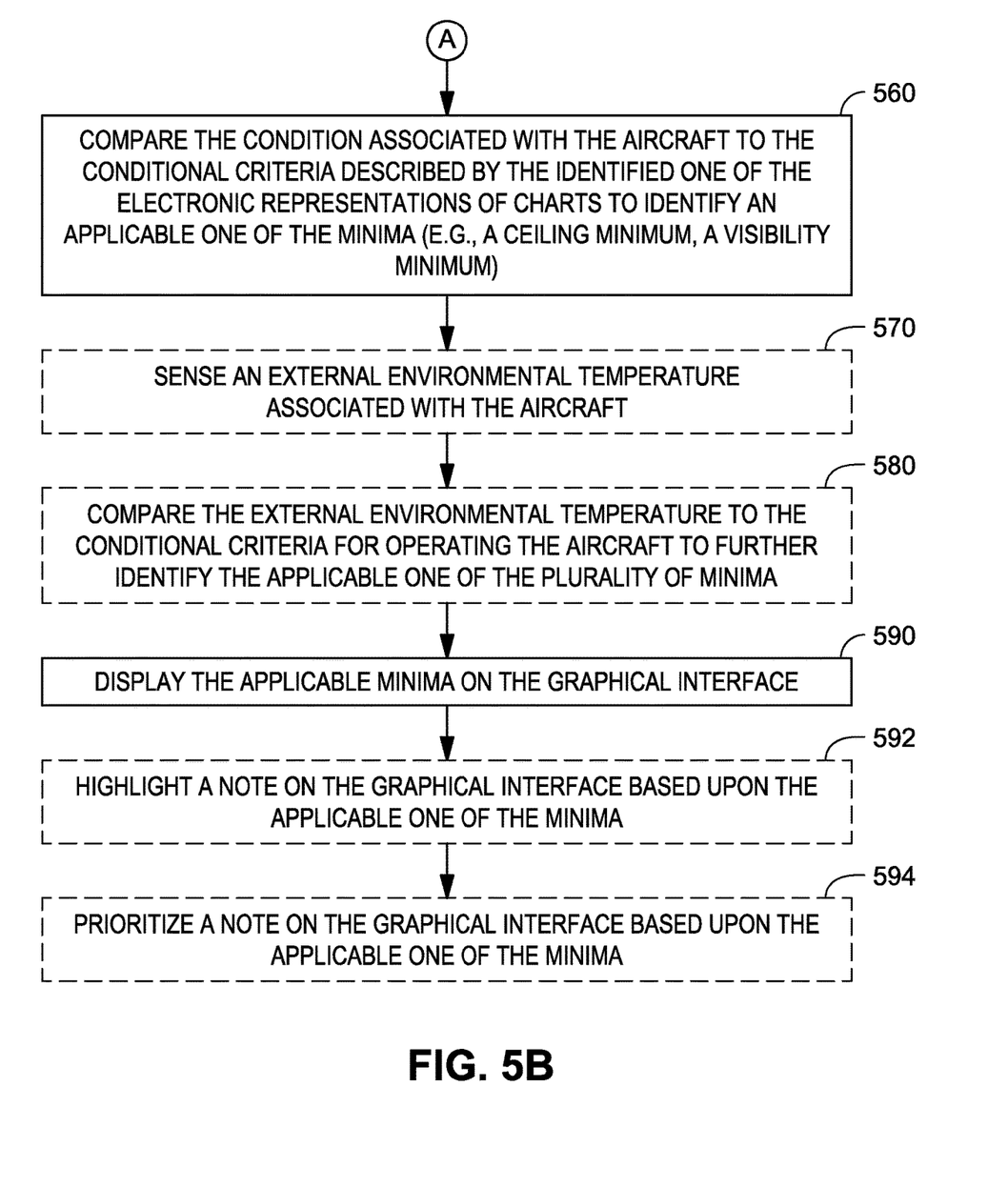
FIG. 5B is another flow diagram illustrating a method for displaying flight-related information for an aircraft, receiving a selection of the flight-related information, identifying an applicable electronic representation of a chart based upon the selection, and displaying a minimum based upon comparing a condition associated with the aircraft to the applicable electronic representation of the chart in accordance with example embodiments of the present disclosure.

FIGS. 5A through 5B depict an example method 500 for operating a flight deck system, such as integrated avionics system 100, to determine applicable approach minima. As shown in FIG. 5A, one or more selectable items are displayed via the graphical interface 104 (Block 510). Each of the selectable items corresponds to one of the electronic representations of charts (e.g., IAP charts) stored via memory 114. As described above, each electronic chart representation describes navigation data 122 associated with an airport, such as baseline minima 124 (e.g., visibility minimum, ceiling minimum, etc.) and associated conditional criteria. In implementations, conditional criteria can include, but are not limited to adjustments for inoperative components 126 (e.g., based on operational status of aircraft systems and/or instrumentation, or airport systems and/or instrumentation (e.g., approach lighting, altimeter, etc.), procedural chart notes 128 (e.g., instructional notes associated with the approach such as instrument-specific notes, temperature notes, etc.), and so forth. The selectable items are arranged on the graphical interface 104 (Block 520).

A selection is received, via control interface 106, of one of the selectable items (Block 530). In some embodiments, the control interface 106 is configured for touch inputs (buttons, selectable menus, etc.) received via a touch surface. In other embodiments, input can be received from other input devices (buttons, cursors, bezels, wheels, etc.) of the integrated avionics system 100. Based on the selection, a corresponding electronic chart representation is identified (Block 540). For example, based on a pilot selection of an approach procedure, the processor 110 is operable to identify a corresponding electronic chart representation.

A condition associated with the aircraft is received (Block 550). As described above, the condition associated with the aircraft can include a condition of the aircraft or a condition of the related environment (e.g., the airport environment). In implementations, the condition can include an operational characteristic (e.g., aircraft approach category 134 or other aircraft speed characteristic, an altitude characteristic, etc.), an environmental characteristic (e.g., temperature, precipitation type/level, wind speed, wind direction, weather rating, time of day, restricted air space, etc.), and/or an inoperative component of an aircraft system and/or instrument or an airport system and/or instrument (e.g., approach light system, touch down zone lights, runway centerlight system, altimeter, etc.). In some implementations, the condition can include custom information 138 (e.g., individual pilot minimums, organizational policies, etc.) specific to the pilot, or other manually-entered data 132 associated with the aircraft or the related environment. In some implementations, the condition can include dynamic information 136 associated with a real-time characteristic of the aircraft.

The condition associated with the aircraft can be received from a variety of sources. In some implementations, the condition is received via the control interface 106 (Block 552). For example, the condition may be received via touch input and/or other input device. Alternatively, the condition may be received directly from aircraft or airport instrumentation (Block 554). For example, the condition may be received directly, via the controller 108, from aircraft instrumentation 142, the aircraft communications system, other aircraft systems, airport or ground systems/instrumentation, or aircraft or environmental sensors (e.g., airport sensors).

The condition associated with the aircraft is compared to the conditional criteria described by the electronic chart representation to identify an applicable minima (e.g., ceiling minimum 116 and/or visibility minimum 118) (Block 560). In implementations, the processor is operable, via the minima engine 130 to compare the aircraft condition with the stored baseline minima 124 and associated conditional criteria. Based on this comparison, the baseline minima 124 are adjusted to generate the applicable ceiling minimum 116 and/or visibility minimum 118. Thus, the applicable minima may be identified through calculation, through selection of one or more values from a set of possible values, combinations thereof, and the like.

In some implementations, an external environmental characteristic (e.g., temperature) associated with the aircraft is received (e.g., sensed, received via the aircraft communications system, etc.) (Block 570). In some implementations, the system 100 includes one or more sensors for providing data associated with a condition of the aircraft and/or the related environment to the controller 108. For example, the system 100 can include a temperature sensor 140 for sensing an external environmental temperature associated with the aircraft (e.g., airport temperature). In other embodiments, the external environmental temperature is received via the aircraft communications system (e.g., mobile data, weather notifications, etc.). As described above, aircraft instruments 142 and/or sensors or airport instruments and/or sensors (e.g., temperature sensor 140), can be utilized to provide real-time data associated with a dynamic condition of the aircraft. The external environmental temperature is compared to the conditional criteria to further identify the applicable minima (Block 580). The processor 110 is operable, via the minima engine 130, to adjust the initially identified applicable minima based on the sensed external temperature. For example, the processor 110 can utilize the external environmental temperature to determine if a temperature compensation 144 (e.g., cold temperature compensation) is required for identifying the applicable minima.

The applicable minima are displayed on the graphical interface 104 (Block 590). In implementations, the processor 110 is operable to display, via the graphical interface 104, the applicable ceiling minimum 116 and/or visibility minimum 118. In some implementations, the graphical interface 104 is configured to show the initial baseline minima 124 corresponding to the electronic chart representation, and show real-time adjustments of the ceiling minimum 404 and/or visibility minimum 406 as the applicable minima are identified based on the aircraft condition information received from the pilot, aircraft instrumentation, the aircraft communications system, other aircraft systems, airport or ground systems/instrumentation, aircraft or environmental sensors, and so forth.

In some implementations, one or more procedural notes (e.g., notes 128) based upon the electronic chart representation and/or the applicable minima are displayed. Such notes 128 are based on chart notes 128 corresponding to the electronic chart representation, and may include navigational equipment required for the selected procedure, approach authorization information, other navigational notes related to the procedure, and so forth. In some implementations, a note 128 is highlighted on the graphical interface 104 based on the applicable minima (Block 592). In some implementations, a note 128 is prioritized on the graphical interface 104 based upon the applicable minima (Block 594). For example, a prioritized note may be displayed at the top of a notes window of the graphical interface 104. In such implementations, the processor 110 is operable, via the minima engine 130, to identify such highlighting or other prioritization of the graphical interface 104 (e.g., notes highlighting and prioritization 120) to indicate importance and/or hierarchical order of notes 128.

It is to be understood that the terms "operator" and "pilot" are used interchangeably herein to describe any pilot, co-pilot, crew member, or other person who operates or controls the aircraft.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A flight deck system for an aircraft, the flight deck system comprising:
    a processor;
    a graphical interface for displaying flight-related information, the flight-related information including a plurality of selectable items arrangeable on the graphical interface, each one of the plurality of selectable items corresponding to one of a plurality of electronic representations of charts, each one of the plurality of electronic representations of charts describing a plurality of minima and associated conditional criteria for operating the aircraft proximate to an airport;
    a control interface for receiving a selection of one of the plurality of selectable items; and
    a non-transitory computer-readable storage medium for storing the plurality of electronic representations of charts, the non-transitory computer-readable storage medium having computer executable instructions stored thereon for execution by the processor to
    arrange the plurality of selectable items on the graphical interface,
    receive a selection of one of the plurality of selectable items,
    in response to the selection, identify a corresponding one of the plurality of electronic representations of charts,
    receive at least one condition associated with the aircraft,
    compare the at least one condition associated with the aircraft to the conditional criteria for operating the aircraft described by the identified one of the plurality of electronic representations of charts to identify an applicable one of the plurality of minima, and
    display the applicable one of the plurality of minima on the graphical interface.

2. The flight deck system as recited in claim 1, wherein the at least one condition associated with the aircraft comprises at least one of an operational characteristic, an environmental characteristic, or an inoperative component.

3. The flight deck system as recited in claim 1, wherein the applicable one of the plurality of minima comprises at least one of a ceiling minimum or a visibility minimum.

4. The flight deck system as recited in claim 1, wherein the computer executable instructions are configured to cause the processor to identify at least one of a highlighting or a prioritization for the graphical interface based upon the applicable one of the plurality of minima.

5. The flight deck system as recited in claim 1, wherein the at least one condition is received via the control interface.

6. The flight deck system as recited in claim 5, wherein the at least one condition comprises an aircraft approach category.

7. The flight deck system as recited in claim 1, wherein the at least one condition is received from at least one of aircraft instrumentation or airport instrumentation.

8. A flight deck system for an aircraft, the flight deck system comprising:
    a processor;
    a graphical interface for displaying flight-related information, the flight-related information including a plurality of selectable items arrangeable on the graphical interface, each one of the plurality of selectable items corresponding to one of a plurality of electronic representations of charts, each one of the plurality of electronic representations of charts describing a plurality of minima and associated conditional criteria for operating an aircraft;
    a control interface for receiving a selection of one of the plurality of selectable items; and
    a non-transitory computer-readable storage medium for storing the plurality of electronic representations of charts, the non-transitory computer-readable storage medium having computer executable instructions stored thereon for execution by the processor to
    arrange the plurality of selectable items on the graphical interface,
    receive a selection of one of the plurality of selectable items,
    in response to the selection, identify a corresponding one of the plurality of electronic representations of charts,
    receive at least one condition associated with the aircraft,
    compare the at least one condition associated with the aircraft to the conditional criteria for operating the aircraft described by the identified one of the plurality of electronic representations of charts to identify an applicable one of the plurality of minima, and
    display the applicable one of the plurality of minima on the graphical interface.

9. The flight deck system as recited in claim 8, wherein at least one of the plurality of selectable items comprises an identification of an airport.

10. The flight deck system as recited in claim 8, wherein the at least one condition associated with the aircraft comprises at least one of an operational characteristic, an environmental characteristic, or an inoperative component.

11. The flight deck system as recited in claim 8, wherein the applicable one of the plurality of minima comprises at least one of a ceiling minimum or a visibility minimum.

12. The flight deck system as recited in claim 8, wherein the computer executable instructions are configured to cause the processor to identify at least one of a highlighting or a prioritization for the graphical interface based upon the applicable one of the plurality of minima.

13. The flight deck system as recited in claim 8, wherein the at least one condition is received via the control interface.

14. The flight deck system as recited in claim 8, wherein the at least one condition comprises an aircraft approach category.

15. The flight deck system as recited in claim 8, wherein the at least one condition is received from aircraft instrumentation.

16. A method comprising:
   displaying, via a graphical interface for flight-related information, a plurality of selectable items, each one of the plurality of selectable items corresponding to one of a plurality of electronic representations of charts, each one of the plurality of electronic representations of charts describing a plurality of minima and associated conditional criteria for operating an aircraft;
   arranging the plurality of selectable items on the graphical interface;
   receiving, via a control interface, a selection of one of the plurality of selectable items;
   in response to the selection, identifying a corresponding one of the plurality of electronic representations of charts;
   receiving at least one condition associated with the aircraft, the at least one condition associated with the aircraft including at least one of an operational characteristic, an environmental characteristic, or an inoperative component;
   comparing the at least one condition associated with the aircraft to the conditional criteria for operating the aircraft described by the identified one of the plurality of electronic representations of charts to identify an applicable one of the plurality of minima; and
   displaying the applicable one of the plurality of minima on the graphical interface.

17. The method as recited in claim 16, wherein the at least one condition is received via the control interface.

18. The method as recited in claim 17, wherein the at least one condition is received from aircraft instrumentation.

* * * * *